(12) United States Patent
Lin et al.

(10) Patent No.: US 10,817,026 B2
(45) Date of Patent: Oct. 27, 2020

(54) FOLDABLE TERMINAL

(71) Applicant: GUANGDONG OPPO MOBILE TELECOMMUNICATIONS CORP., LTD., Dongguan, Guangdong (CN)

(72) Inventors: Yugui Lin, Guangdong (CN); Jiao Cheng, Guangdong (CN); Weibin Yu, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/530,897

(22) Filed: Aug. 2, 2019

(65) Prior Publication Data

US 2019/0356763 A1 Nov. 21, 2019

Related U.S. Application Data

(63) Continuation of application No. 16/060,794, filed as application No. PCT/CN2016/113002 on Dec. 29, 2016, now Pat. No. 10,416,724.

(30) Foreign Application Priority Data

Dec. 29, 2015 (CN) .......................... 2015 1 1026053

(51) Int. Cl.
*G06F 1/16* (2006.01)
*H04M 1/02* (2006.01)

(52) U.S. Cl.
CPC .......... *G06F 1/1652* (2013.01); *G06F 1/1616* (2013.01); *G06F 1/1618* (2013.01);
(Continued)

(58) Field of Classification Search
CPC .... G06F 1/1652; G06F 1/1618; G06F 1/1675; G06F 1/1656
See application file for complete search history.

(56) References Cited

U.S. PATENT DOCUMENTS 9,506,279 B2 * 11/2016 Kauhaniemi ......... G06F 1/1652
9,785,200 B1 * 10/2017 Knoppert .............. G06F 1/1681
(Continued)

FOREIGN PATENT DOCUMENTS

CN 102616454 A 8/2012
CN 103294113 A 9/2013
(Continued)

OTHER PUBLICATIONS

European Patent Application No. 19176746.6 extended Search and Opinion dated Sep. 20, 2019, 5 pages.
(Continued)

*Primary Examiner* — Nidhi Thaker
(74) *Attorney, Agent, or Firm* — Lathrop GPM LLP

(57) ABSTRACT

A foldable terminal is provided. The foldable terminal includes a housing including two casings and a bendable portion capable of being bent and deformed, the bendable portion being connected between the two casings; a flexible screen; and an air bag provided between the bendable portion and the flexible screen. When the foldable terminal is in an unfolded state, gas is in the air bag, and the air bag supports an inner side of the flexible screen, when the foldable terminal is in a folded state, the gas is moved out of the air bag to make the air bag shrunken.

20 Claims, 3 Drawing Sheets

(52) U.S. Cl.
CPC .......... *G06F 1/1641* (2013.01); *G06F 1/1656* (2013.01); *G06F 1/1675* (2013.01); *H04M 1/0216* (2013.01); *H04M 1/0268* (2013.01)

(56) References Cited

U.S. PATENT DOCUMENTS

| | | | |
|---|---|---|---|
| 10,382,600 B2* | 8/2019 | Lin | H04M 1/0268 |
| 10,534,400 B2* | 1/2020 | Wu | G06F 1/1641 |
| 10,623,538 B1* | 4/2020 | Carlson | H04M 1/0277 |
| 2008/0300031 A1* | 12/2008 | Cho | H04M 1/0216 455/575.3 |
| 2011/0193829 A1 | 8/2011 | Tsai et al. | |
| 2012/0262870 A1* | 10/2012 | Leung | G06F 1/1626 361/679.27 |
| 2012/0307423 A1* | 12/2012 | Bohn | G06F 1/1652 361/679.01 |
| 2013/0037228 A1 | 2/2013 | Verschoor et al. | |
| 2013/0083496 A1* | 4/2013 | Franklin | G06F 1/1677 361/749 |
| 2015/0220117 A1* | 8/2015 | Lee | G06F 1/1652 361/749 |

FOREIGN PATENT DOCUMENTS

| | | |
|---|---|---|
| CN | 103827771 A | 5/2014 |
| CN | 204331666 U | 5/2015 |
| CN | 104863928 A | 8/2015 |
| CN | 104898784 A | 9/2015 |
| CN | 104916230 A | 9/2015 |
| CN | 105118401 A | 12/2015 |
| CN | 105652975 A | 6/2016 |
| KR | 20150092773 A | 8/2015 |

OTHER PUBLICATIONS

PCT/CN2016/113002 English translation of International Search Report dated Apr. 6, 2017, 2 pages.
PCT/CN2016/113002 International Search Report and Written Opinion dated Apr. 6, 2017, 12 pages.
Korean Patent Application No. 10-2018-7014388 Office Action dated Jul. 15, 2019, 10 pages.
Korean Patent Application No. 10-2018-7014388 English translation of Office Action dated Jul. 15, 2019, 8 pages.
Chinese Patent Application No. 201810228123.9 First Office Action dated May 8, 2020, 7 pages.
Chinese Patent Application No. 201810228123.9 English translation of First Office Action dated May 8, 2020, 8 pages.
Chinese Patent Application No. 201810228123.9 Second Office Action dated Jul. 27, 2020, 3 pages.
Chinese Patent Application No. 201810228123.9 English translation of Second Office Action dated Jul. 27, 2020, 4 pages.

* cited by examiner

FOLDABLE TERMINAL

CROSS-REFERENCE TO RELATED APPLICATIONS

This application is a Continuation Application of U.S. application Ser. No. 16/060,794, filed Jun. 8, 2018, which is a National Stage entry of International Application No. PCT/CN2016/113002 filed Dec. 29, 2016, which claims priority to and benefits of Chinese Patent Application No. 201511026053.1, filed with China National Intellectual Property Administration on Dec. 29, 2015, the entire contents of which are incorporated herein by reference.

FIELD

The present disclosure relates to a technical field of electronic equipment, and more particularly to a foldable terminal.

BACKGROUND

A flexible screen is a trend of a mobile electronic product in the future. In the related art, the flexible screen is fixed on a main body of a mobile terminal, and for a terminal product that is repeatedly bent and used, the terminal product is generally divided into two parts when folded once. The flexible screen is arranged at an inner side of the fold, and can be seen after the terminal product is unfolded.

SUMMARY

Embodiments of the present disclosure provide a foldable terminal, including a housing including two casings and a bendable portion capable of being bent and deformed, the bendable portion being connected between the two casings; a flexible screen; and an air bag provided between the bendable portion and the flexible screen. When the foldable terminal is in an unfolded state, gas is in the air bag, and the air bag supports an inner side of the flexible screen, when the foldable terminal is in a folded state, the gas is moved out of the air bag to make the air bag shrunken.

Embodiments of the present disclosure also provide another foldable terminal, including: a housing including two casings and a bendable portion, the bendable portion being capable of being bent and deformed and being connected between the two casings; two main bodies fixed to the two casings correspondingly, a first air bag provided between the two bodies; two second air bags provided in the two main bodies correspondingly, the first air bag being in communication with the two second air bags, and the first air bag and the two second air bags both being filled with gas. When the foldable terminal is in a folded state, the gas is moved from the first air bag into the two second air bags, the two second air bags are bulged while the first air bag is shrunken; and when the foldable terminal is in an unfolded state, the gas is moved from the two second air bags into the first air bag, the two second air bags are shrunken while the first air bag is bulged.

Embodiments of the present disclosure further provide still another foldable terminal, including a housing including two casings and a bendable portion, the bendable portion being capable of being bent and deformed and being connected between the two casings; two main bodies fixed to the two casings correspondingly, a first air bag corresponding to the bendable portion; two second air bags, provided at two side end face of one of the two main bodies correspondingly, the first air bag being in communication with the two second air bags, and the first air bag and the two second air bags both being filled with gas. When the foldable terminal is in a folded state, the gas is in the second air bag; and when the foldable terminal is in an unfolded state, the gas is moved from the second air bag into the first air bag, and the first air bag supports an inner side of the bendable region.

DETAILED DESCRIPTION

Figure 1:
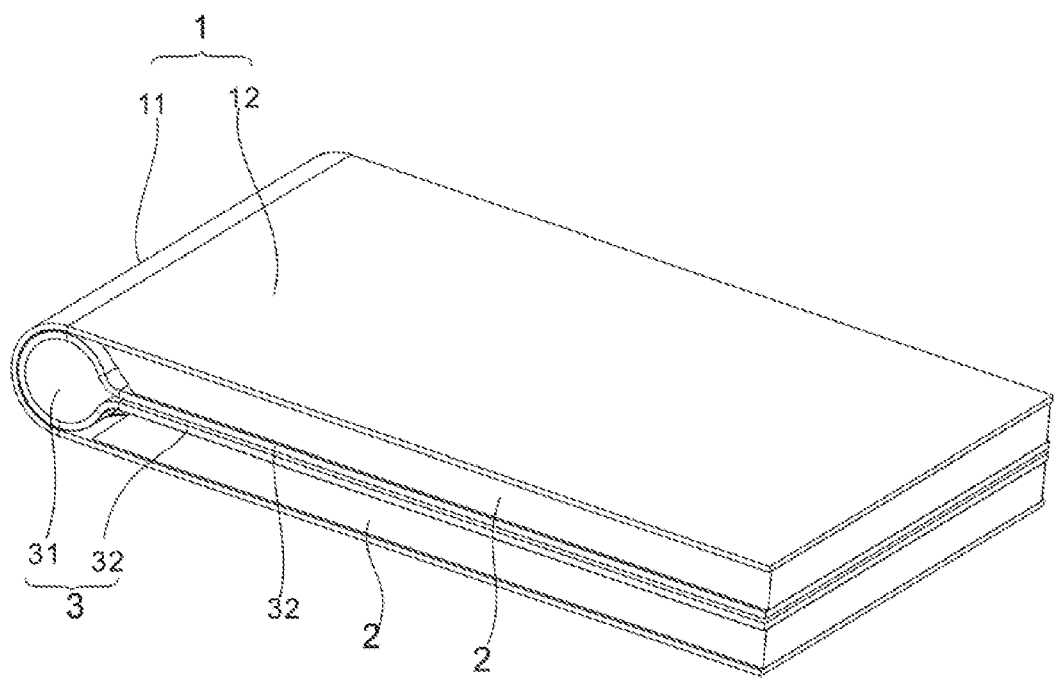
FIG. 1 is a perspective schematic illustration of a foldable terminal according to a first embodiment of the present disclosure, in which the mobile terminal is in a folded state.
Figure 2:
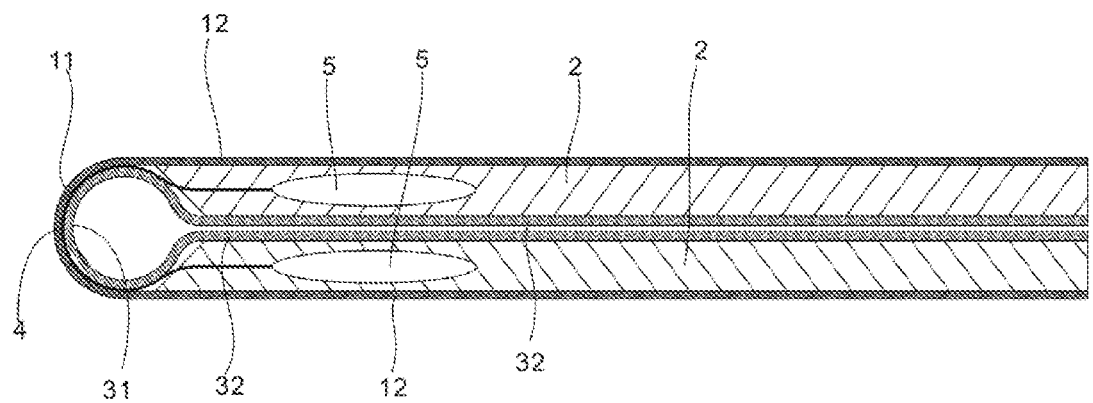
FIG. 2 is a sectional schematic illustration of the foldable terminal as shown in FIG. 1, in which the mobile terminal is in the folded state.
Figure 3:
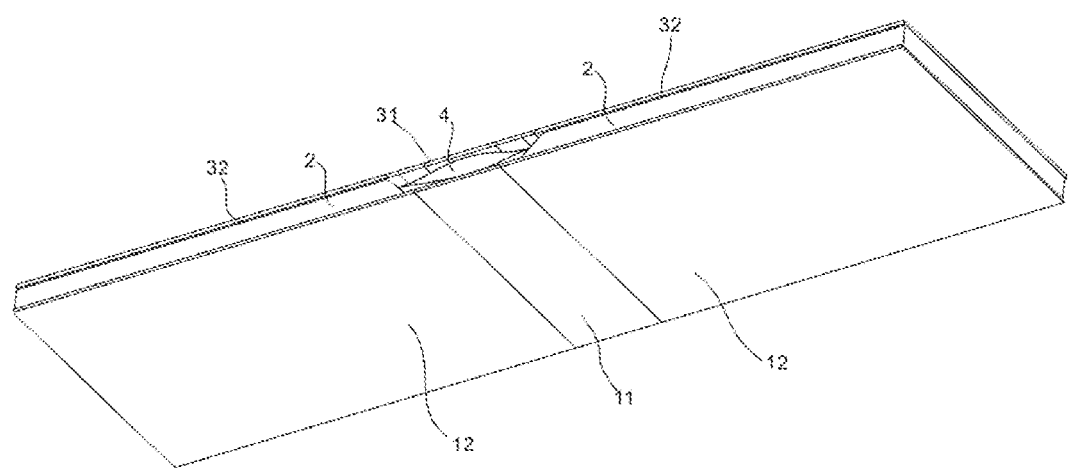
FIG. 3 is a perspective schematic illustration of the foldable terminal as shown in FIG. 1, in which the mobile terminal is in an unfolded state.
Figure 4:
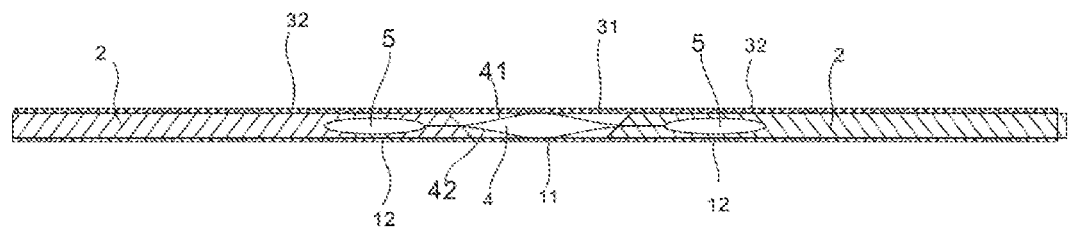
FIG. 4 is a sectional schematic illustration of the foldable terminal as shown in FIG. 1, in which the mobile terminal is in the unfolded state.

Technical solutions in embodiments of the present disclosure will be described clearly and completely in combination with reference to the accompanying drawings in the embodiments of the present disclosure. Obviously, the described embodiments are only a part of the embodiments of the present disclosure, rather than all of the embodiments. Based on the embodiments of the present disclosure, all the other embodiments obtained by those skilled in the art without creative efforts shall fall into the protection scope of the present disclosure.

The drawings illustrate a foldable terminal according to the present disclosure, and the terminal may be any terminal device, such as a tablet computer, a mobile phone, an e-reader, a remote controller, a personal computer (PC), a notebook computer, a vehicle-mounted device, a network television, a wearable device, and the like.

The present disclosure provides a foldable terminal. The foldable terminal includes a housing including two casings and a bendable portion capable of being bent and deformed, the bendable portion being connected between the two casings; a flexible screen; and an air bag provided between the bendable portion and the flexible screen. When the foldable terminal is in an unfolded state, gas is in the air bag, and the air bag supports an inner side of the flexible screen, when the foldable terminal is in a folded state, the gas is moved out of the air bag to make the air bag shrunken.

The present disclosure also provides another foldable terminal. The foldable terminal includes a housing including two casings and a bendable portion, the bendable portion being capable of being bent and deformed and being connected between the two casings; two main bodies fixed to the two casings correspondingly, a first air bag provided between the two bodies; two second air bags provided in the two main bodies correspondingly, the first air bag being in communication with the two second air bags, and the first air bag and the two second air bags both being filled with gas. When the foldable terminal is in a folded state, the gas is moved from the first air bag into the two second air bags, the two second air bags are bulged while the first air bag is shrunken; and when the foldable terminal is in an unfolded state, the gas is moved from the two second air bags into the first air bag, the two second air bags are shrunken while the first air bag is bulged.

The present disclosure further provides still another foldable terminal. The foldable terminal includes a housing including two casings and a bendable portion, the bendable portion being capable of being bent and deformed and being connected between the two casings; two main bodies fixed to the two casings correspondingly, a first air bag corresponding to the bendable portion; two second air bags, provided at two side end face of one of the two main bodies correspondingly, the first air bag being in communication with the two second air bags, and the first air bag and the two second air bags both being filled with gas. When the foldable terminal is in a folded state, the gas is in the second air bag; and when the foldable terminal is in an unfolded state, the gas is moved from the second air bag into the first air bag, and the first air bag supports an inner side of the bendable region.

As illustrated in FIGS. 1 to 4, the foldable terminal includes a housing 1, two main bodies 2, a flexible screen 3, a first air bag 4 and a second air bag 5. The two main bodies 2 are both fixed to the housing 1; the first air bag 4 is located between the two main bodies 2 while the second air bag 5 is provided to the main body 2; and the flexible screen 3 is fixed to respective inner surfaces of the two main bodies 2. When the two main bodies 2 are folded or unfolded, the flexible screen 3 can be folded or unfolded along with them.

An outer side surface of the foldable terminal is formed on the housing 1. The housing 1 includes two casings 12 and a bendable portion 11, and the bendable portion 11 is capable of being bent and deformed and is connected between the two casings 12. The two main bodies 2 are fixed to the two casings 12 correspondingly. The two casings 12 can be integrally formed with the bendable portion 11 to enhance structural strength of connection. The housing 1 can be made of a bendable material, such as silica gel, leather, cloth, and a polycarbonate (PC) thin sheet. Optionally, the housing 1 itself has a flat and straight plate structure in a natural state, i.e. the housing 1 has a flat and straight plate structure in an unfolded state with two casings 12 being spread and exhibiting an included angle of 180 degrees. The housing 1 can be bent under the action of an external force to make the included angle between the two casings 12 become 0 degree, thereby being transformed into a folded state.

In this embodiment, the housing 1 is entirely made of a bendable and deformable material, and herein, in other embodiments, it is possible that only the bendable portion 11 employs the bendable and deformable material while the two casings 12 are made of other materials, and two ends of the bendable portion 11 are fixedly connected to the two casings 12 correspondingly.

The two main bodies 2 are fixed to the two casings 12 correspondingly. The two main bodies 2 each are internally provided with a built-in circuit board, a battery and other components. Certainly, in other embodiments, it is possible that only one main body 2 is internally provided with a battery and a circuit board, and the one main body 2 is electrically coupled with the other main body 2 to realize power supply and signal transmission of the other main body 2. A flexible circuit board (not illustrated) is connected between the two main bodies 2, and the electrical connection between the two main bodies 2 can be realized by using the flexible circuit board.

The flexible circuit board is fixed to the bendable portion 11 and can be bent or unfolded along with the bendable portion 11, which facilitates the structural arrangement of the flexible circuit board and prevents the flexible circuit board from interfering with other internal structural components.

More specifically, the flexible circuit board can be embedded into the bendable portion 11, and two ends of the flexible circuit board are detachably connected with the two main bodies 2 by means of electrical connectors. With the flexible circuit board embedded in the bendable portion 11, it is possible to reduce an occupied space, decrease the number of parts of the terminal, and effectively avoid interference between the flexible circuit board and other internal structural components. Herein, in other embodiments, the flexible circuit board can be attached and fixed to an inner surface of the bendable portion 11 or to an inner surface of the flexible screen 3.

The flexible screen 3 is located at an inner surface of the foldable terminal. The flexible screen 3 includes two fixed regions 32 and a bendable region 31. The two fixed regions 32 are fixed to the two main bodies 2 correspondingly. The bendable region 31 is connected between the two fixed regions 32, and the three are formed integrally. The bendable region 31 is connected with the fixed regions 32 seamlessly to ensure the integrity of the flexible screen 3 and guarantee a visual effect of display.

The flexible screen 3 has a flexible display screen and a touch layer superposed on the display screen. Information display can be realized by means of the display screen, and touch control over the terminal can be achieved through the touch layer.

The first air bag 4 is provided between the bendable portion 11 and the bendable region 31. The second air bag 5 is provided to the main body 2. The first air bag 4 is in communication with the second air bag 5, and both of them are filled with gas. The gas may be sealed in the first air bag and the second air bag.

When the foldable terminal is in the folded state, the sealed gas is located in the second air bag 5, in which case the second air bag 5 is bulged while the first air bag 4 is shrunken and pressed between the bendable region 31 and the bendable portion 11, thereby providing an available space for the bending of the bendable portion 11 by utilizing the folding and bending of the flexible screen.

When the foldable terminal is in the unfolded state, the sealed gas is moved from the air bag 5 to the air bag 4. In such a case, the second air bag 5 is shrunken while the first air bag 4 is bulged, and the first air bag 4 supports an inner side of the bendable region 31, thereby solving the technical problem of poor pressing experience due to the suspension of the bendable region 31.

After the foldable terminal is unfolded, the flexible screen 3 is flat overall. Since the first air bag 4 can support the bendable region 31 of the flexible screen 3, it is possible to address the technical problem that the pressing experience is poor at the middle portion (i.e. the bendable region 31) which is suspended after the flexible screen 3 is unfolded. After the foldable terminal is folded, the sealed gas in the first air bag 4 enters the second air bag 5 under extrusion by the bendable region 31, the first air bag 4 can leave space for bending of the bendable region 31 of the flexible screen 3, thus preventing the bendable region 31 from being squeezed and damaged.

In this embodiment, the first air bag 4 includes a first bag wall 41 and a second bag wall 42, and the first bag wall 41 is closer to the bendable region 31 compared with the second bag wall 42. When the sealed gas is located in the first air bag 4, a central portion of the first bag wall 41 protrudes towards the bendable region 31 and is arched, and a central portion of the second bag wall 42 protrudes towards the bendable portion 11 and is arched. When the first air bag 4 is bulged, the first bag wall 41 and the second bag wall 42 are arched oppositely, thereby making it convenient for the both to approach each other or get away from each other, and facilitating discharge and intake of the sealed gas. Moreover, the support for the bendable region 31 can be achieved by the minimum sealed gas, thereby reducing the volumes of the first air bag 4 and the second air bag 5 and facilitating a light and thin design of the foldable terminal.

Optionally, the central portion of the first bag wall 41 is fixedly connected with the bendable region 31, and the first bag wall 41 can drive the bendable region 31 to be bent and moved, thereby facilitating the folding and unfolding of the flexible screen, and preventing the bendable region 31 from being squeezed and damaged by the two main body due to failure of normal bend when folded.

In this embodiment, the second air bag 5 is provided in the main body, and a bag wall of the second air bag 5 is made of an elastic material. When the sealed gas is located in the second air bag 5, the second air bag 5 is elastically deformed. When the foldable terminal is in the unfolded state, the sealed gas is moved into the first air bag 4 under the action of an elastic force of the second air bag 5. By use of elasticity of the second air bag 5 itself, the sealed gas in the second air bag 5 may be squeezed out under the elastic force of the bag wall during the unfolding of the foldable terminal, and then the sealed gas enters the first air bag 4 to offer support to the bendable region 31 of the flexible screen.

Optionally, two second air bags 5 are provided and arranged in the two main bodies 2 respectively. By means of the two second air bags 5, the sealed gas may be divided into two parts in the folded state and located in the two second air bags 5, thereby reducing the space occupied by the second air bag 5 in the corresponding main body 2.

As for a foldable terminal having a flexible screen proposed by a second embodiment of the present disclosure, the first air bag, the housing and so on are identical to those described in the first embodiment, which will not be elaborated again. The following detailed description focuses on the differences from the first embodiment.

Figure 5:
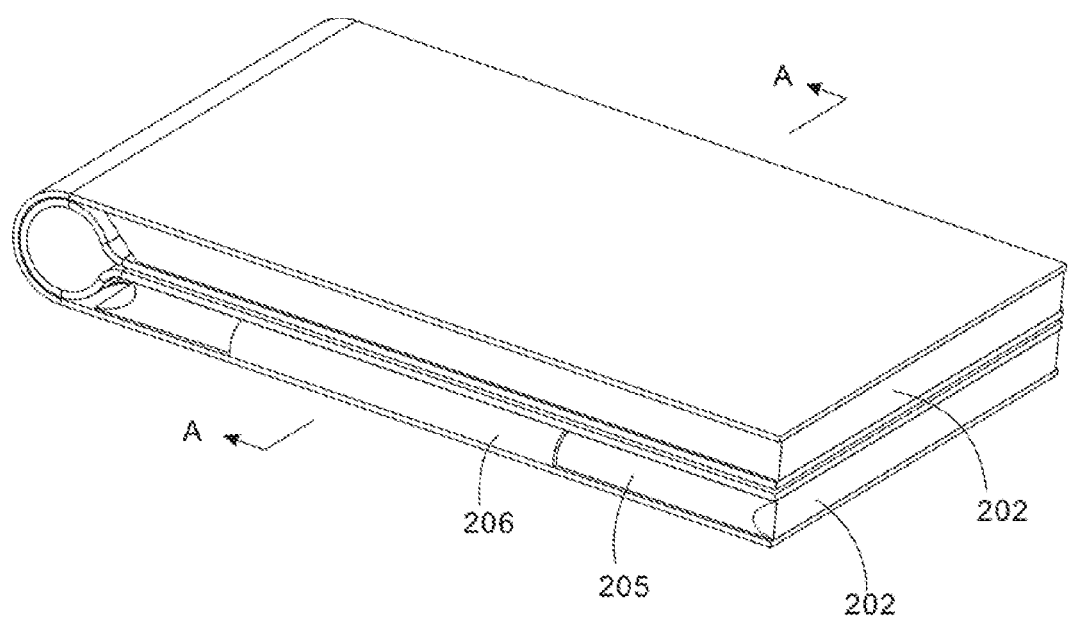
FIG. 5 is a perspective schematic illustration of a foldable terminal according to a second embodiment of the present disclosure, in which the mobile terminal is in a folded state.
Figure 6:
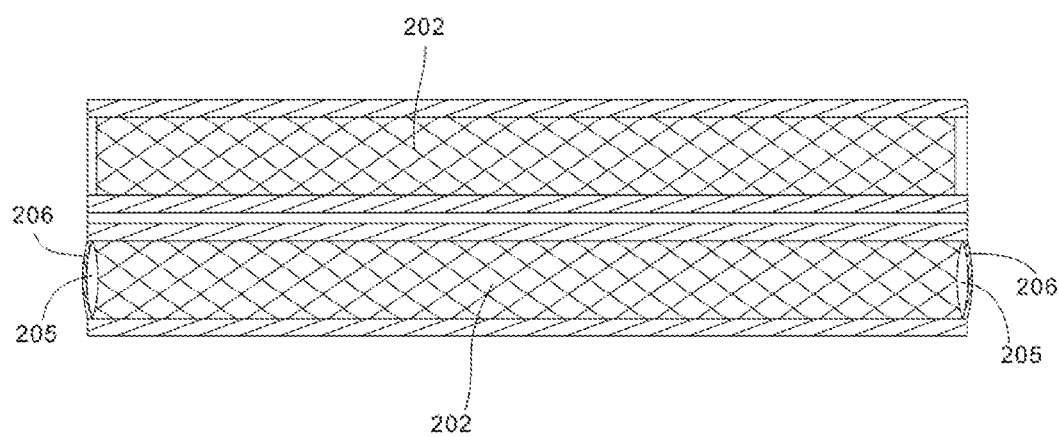
FIG. 6 is a sectional schematic illustration taken along A-A in FIG. 5.
Figure 7:
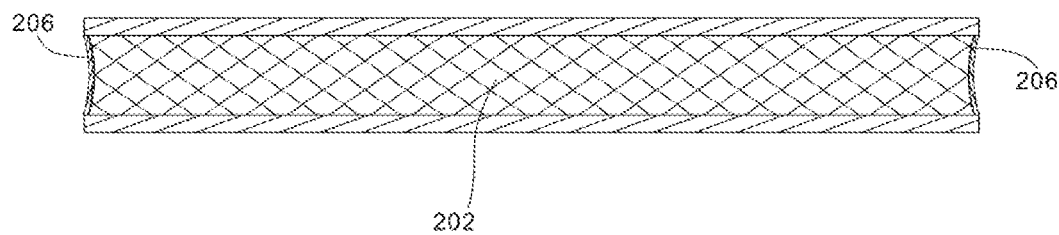
FIG. 7 is a sectional schematic illustration of the foldable terminal of FIG. 6 in an unfolded state.

As illustrated in FIGS. 5 to 7, in the second embodiment, a second air bag 205 is provided to a side end face of a main body 202 and has a long strip shape extending along the side end face of the main body 202. By providing the second air bag 205 to an outer side of the main body 202, the user can squeeze the second air bag 205 personally when unfolding the foldable terminal, thereby squeezing the sealed gas in the second air bag 205 into the first air bag. The second air bag 205 is located on the side end face of the main body 202, making it convenient for the user to squeeze the second air bag 205.

In this embodiment, since the user can squeeze the second air bag 205 by himself/herself, the second air bag 205 itself can have elasticity or have no elasticity. Optionally, a bag wall of the second air bag 205 has elasticity as discussed in the first embodiment, such that the second air bag 205 keeps shrunken when the foldable terminal is in the unfolded state, thereby preventing the sealed gas in the first air bag from flowing back to the second air bag 205 when the user normally operates and presses the bendable region in the unfolded state.

Two second air bags 205 may be provided and symmetrically arranged at two opposite side end faces of the same main body 202, to ensure symmetry of the two sides of the main body 202 and at the same time, further facilitate squeezing the second air bags 205 by the user.

Optionally, the side end face of the main body 202 has a concave arc shape to receive the second air bag 205 conveniently.

In order to facilitate squeezing the second air bag 205 by the user, the foldable terminal further includes an resilient sheet 206, the resilient sheet 206 has a long strip shape extending along the side end face of the main body 202, and the second air bag 205 is located between the resilient sheet 206 and the side end face of the main body 202. The resilient sheet 206 has an arch cross section and two ends in a width direction fixedly connected with the main body 202. As illustrated in FIGS. 5 and 6, when the foldable terminal is in the folded state, the resilient sheet 206 protrudes towards the outside of the main body 202. As illustrated in FIG. 7, when the foldable terminal is in the unfolded state, the resilient sheet 206 is elastically deformed towards the side end face of the main body 202 and defines a recess, thereby squeezing the sealed gas in the second air bag 205 into the first air bag.

The resilient sheet 206 is a stainless steel sheet, a beryllium copper sheet, or a brass sheet. The resilient sheet 206 is arched in a natural state, and due to its own shape characteristics and its own internal stress, when a protruding arc portion at its middle position is impacted by an external force, the middle arc portion will bounce to the other side and protrude in the other direction.

When the user presses the resilient sheet 206, outwards protrusion of the resilient sheet 206 becomes inwards protrusion after deformation, and hence squeezes the second air bag 205, such that the sealed gas is squeezed out of the second air bag 205. Meanwhile, the resilient sheet 206 can be fixed in a state with inwards protrusion to keep the second air bag 205 shrunken. When the foldable terminal is folded, the first air bag squeezes the sealed gas into the second air bag 205 under the compression of the bendable region, and the second air bag 205 is bulged and makes the resilient sheet 206 protrude outwards. Under the action of its own elastic force, the resilient sheet 206 can be deformed rapidly into a state with outwards protrusion to enable the second air bag 205 to bulge rapidly, thereby facilitating the folding of the foldable terminal.

In the second embodiment, the second air bag 205 and the resilient sheet 206 are two separate components, and an outer side wall of the second air bag 205 and an inner surface of the resilient sheet 206 are fixedly connected into one piece. Certainly, in other embodiments, the second air bag 205 and the resilient sheet 206 can be combined as one piece, that is, the outer bag wall of the second air bag 205 is formed by the resilient sheet 206, the inner bag wall of the second air bag 205 can be formed by the side end face of the main body 202, and the second air bag 205 is formed between the resilient sheet 206 and the main body 202, thereby reducing the number of parts and facilitating processing and assembling.

The above are optional embodiments of the present disclosure, and it should be noted that those skilled in the art can make various improvements and modifications without departing from the principle of the present disclosure, and these improvements and modifications are also regarded as the protection scope of the present disclosure.

What is claimed is:

1. A foldable terminal, comprising:
   a housing comprising two casings and a bendable portion capable of being bent and deformed, the bendable portion being connected between the two casings;
   a flexible screen; and
   an air bag provided between the bendable portion and the flexible screen, and having a first bag wall and a second bag wall,
   wherein when the foldable terminal is in an unfolded state, the first bag wall and the second bag wall are arched oppositely, gas is in the air bag, and the air bag supports an inner side of the flexible screen, when the foldable terminal is in a folded state, the gas is moved out of the air bag to make the air bag shrunken.

2. The foldable terminal according to claim 1, further comprising:
   another air bag corresponding to one of the two casings, the air bag being in communication with the another air bag;
   when the foldable terminal is in a folded state, the gas is moved from the air bag into the another air bag, the another air bag is bulged while the air bag is shrunken; and when the foldable terminal is in an unfolded state, the gas is moved from the another air bag into the air bag, the another air bag is shrunken while the air bag is bulged.

3. The foldable terminal according to claim 2, wherein the flexible screen comprises two fixed regions and a bendable region connected between the two fixed regions; the two fixed regions is arranged opposite to the two casings correspondingly, the bendable region is arranged opposite to the bendable portion, and the air bag is arranged between the bendable portion and the bendable region; when the foldable terminal is in the unfolded state, the air bag supports an inner side of the bendable region.

4. The foldable terminal according to claim 3, wherein when the gas is in the air bag, a central portion of the first bag wall protrudes towards the bendable region and is arched.

5. The foldable terminal according to claim 4, wherein the first bag wall is more adjacent to the bendable region compared with the second bag wall; when the gas is in the air bag, a central portion of the second bag wall protrudes towards the bendable portion and is arched.

6. The foldable terminal according to claim 4, wherein the central portion of the first bag wall is fixedly connected with the bendable region.

7. The foldable terminal according to claim 2, further comprising two main bodies fixed to the two casings correspondingly, the two fixed regions being fixed to the two main bodies correspondingly, and the another air bag being provided to one of the two main bodies.

8. The foldable terminal according to claim 7, wherein the another air bag is provided in one of the two main bodies.

9. The foldable terminal according to claim 7, wherein the another air bag is provided to a side end face of one of the two main bodies.

10. The foldable terminal according to claim 9, wherein the another air bag has a long strip shape extending along the side end face of the one of the two main bodies.

11. The foldable terminal according to claim 9, wherein the side end face of the one of the two main bodies has a concave arc shape.

12. The foldable terminal according to claim 9, further comprising a resilient sheet, the another air bag being located between the resilient sheet and the side end face of the one of the two main bodies, and the resilient sheet being configured to squeeze the gas in the another air bag into the air bag.

13. The foldable terminal according to claim 12, wherein the resilient sheet has a long strip shape extending along the side end face of the one of the two main bodies.

14. The foldable terminal according to claim 13, wherein the resilient sheet has an arch cross section and two ends in a width direction fixedly connected with the one of the two main bodies;
   when the foldable terminal is in the folded state, the resilient sheet protrudes towards the outside of the one of the two main bodies; when the foldable terminal is in the unfolded state, the resilient sheet is elastically deformed towards the side end face of the one of the two main bodies and defines a recess, to squeeze the gas in the another air bag into the air bag.

15. The foldable terminal according to claim 12, wherein an outer bag wall of the another air bag is formed by the resilient sheet, and an inner bag wall of the another air bag is formed by the side end face of the one of the two main bodies.

16. The foldable terminal according to claim 2, wherein a bag wall of the another air bag has elasticity to enable the another air bag to keep shrunken when the foldable terminal is in the unfolded state, and when the gas is in the another air bag, the another air bag is elastically deformed; when the foldable terminal is in the unfolded state, the gas is moved into the air bag under the action of an elastic force of the another air bag.

17. The foldable terminal according to claim 2, wherein the another air bag comprises two sub-air bags provided at positions corresponding to the two casings or provided at two sides of the foldable terminal.

18. The foldable terminal according to claim 1, wherein the housing is entirely made of a bendable and deformable material.

19. A foldable terminal, comprising:
   a housing comprising two casings and a bendable portion, the bendable portion being capable of being bent and deformed and being connected between the two casings;
   two main bodies fixed to the two casings correspondingly,
   a first air bag provided between the two bodies and having a first bag wall and a second bag wall;
   two second air bags provided in the two main bodies correspondingly, the first air bag being in communication with the two second air bags, and the first air bag and the two second air bags both being filled with gas;
   wherein when the foldable terminal is in a folded state, the gas is moved from the first air bag into the two second air bags, the two second air bags are bulged while the first air bag is shrunken; and when the foldable terminal is in an unfolded state, the gas is moved from the two second air bags into the first air bag, the first bag wall and the second bag wall are arched oppositely, the two second air bags are shrunken while the first air bag is bulged.

20. A foldable terminal, comprising:
   a housing comprising two casings and a bendable portion, the bendable portion being capable of being bent and deformed and being connected between the two casings;
   two main bodies fixed to the two casings correspondingly,
   a first air bag corresponding to the bendable portion and having a first bag wall and a second bag wall;

two second air bags, provided at two side end face of one of the two main bodies correspondingly, the first air bag being in communication with the two second air bags, and the first air bag and the two second air bags both being filled with gas;

wherein when the foldable terminal is in a folded state, the gas is in the second air bag; and when the foldable terminal is in an unfolded state, the gas is moved from the second air bag into the first air bag, the first bag wall and the second bag wall are arched oppositely, and the first air bag supports an inner side of the bendable region.

* * * * *